United States Patent [19]
Shirzad et al.

[11] 3,816,867
[45] June 18, 1974

[54] INFLATABLE CANOPY

[75] Inventors: Paul P. Shirzad, Palos Verdes Peninsula; David L. Reidt, Lomita, both of Calif.

[73] Assignee: Foremark Corporation, Gardena, Calif.

[22] Filed: June 23, 1972

[21] Appl. No.: 265,734

[52] U.S. Cl. ............................... 14/71, 135/5
[51] Int. Cl. ................................. B65g 11/00
[58] Field of Search ................... 14/71; 135/5, 4

[56] References Cited
UNITED STATES PATENTS

| | | | |
|---|---|---|---|
| 2,266,853 | 12/1941 | Dabney | 135/5 R |
| 2,659,110 | 11/1953 | Carroll | 135/5 R X |
| 3,298,382 | 1/1967 | Larson | 135/5 R |
| 3,310,823 | 3/1967 | Preiss | 14/71 |
| 3,369,264 | 2/1968 | Kurka | 14/71 |
| 3,479,677 | 11/1969 | Burns | 14/71 |
| 3,606,626 | 9/1971 | Eggert | 14/71 |
| 3,639,934 | 2/1972 | Eggert | 14/71 |
| 3,693,204 | 9/1972 | Eggert | 14/71 |
| 3,699,600 | 10/1972 | Gacs | 14/71 |

*Primary Examiner*—Nile C. Byers, Jr.
*Attorney, Agent, or Firm*—Edward D. O'Brian

[57] ABSTRACT

An inflatable canopy which is primarily intended to be utilized in at least partially enclosing the space between an aircraft loading bridge and an aircarft can be constructed utilizing an inflatable member divided up into interconnected internal sections so that when the member is inflated, the inflatable member will flare outwardly from an essentially flat folded position to an inflated position corresponding to the shape of an aircraft hull. A frame means for supporting the sections of the inflatable member in both the folded and inflated positions is provided along with a counterweight folding means for moving the canopy from the inflated position to the folded position. The inflatable member is preferably mounted on a frame body pivotally connected to an aircraft loading bridge. This frame body may be spaced from the bridge; the space between it and the bridge may be enclosed by a bellows.

17 Claims, 4 Drawing Figures

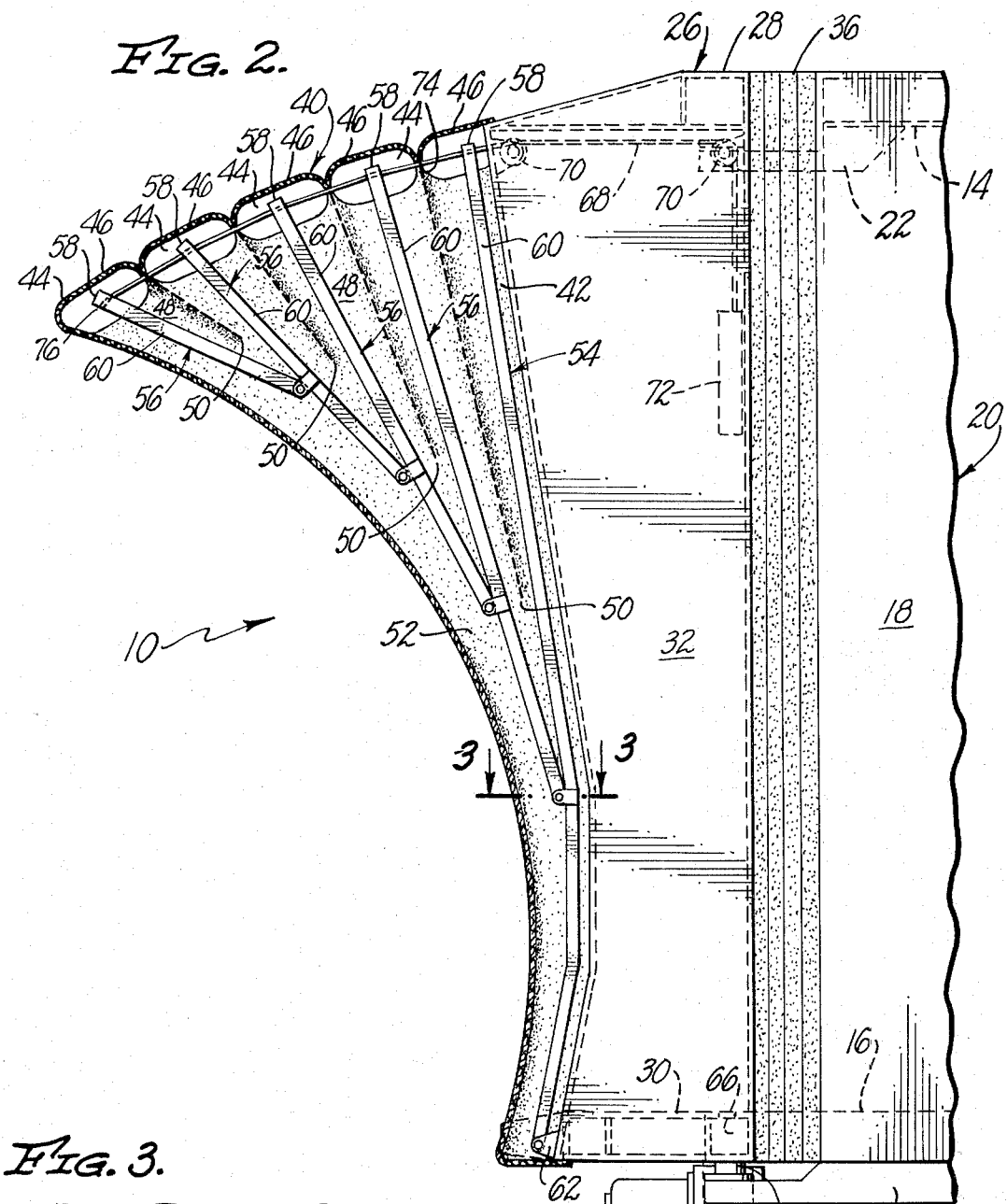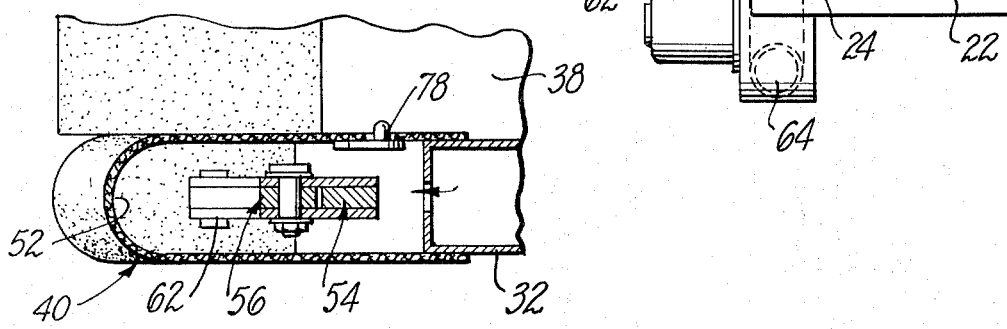

INFLATABLE CANOPY

BACKGROUND OF THE INVENTION:

It is frequently necessary and/or desirable to utilize a canopy to at least partially enclose the space between an opening located in a structure and a movable vehicle parked adjacent to the structure. Thus, for example, in the aircraft field it is desirable to utilize a movable enclosure or canopy at the end of a passenger loading bridge located at an aircraft terminal so as to at least partially enclose the space between the end of the bridge and an aircraft being served by the bridge so as to avoid exposing the users of the bridge to inclement weather conditions.

As a result of the recognition of the need for enclosures or canopies to extend from such bridges and other structures a number of different types of canopy constructions have been developed and to varying extents have been used. It is not considered that an understanding of this invention requires a detailed consideration of such prior art structures. However, a consideration of this invention is best predicated upon a bridf review of the manner in which a canopy as indicated is used.

In the aircraft loading bridge field a canopy or canopy-type enclosure is normally held in a withdrawn position adjacent to an opening in the end of an aircraft loading bridge as an aircraft is moved relative to the opening so that one of its doors is adjacent to the opening. Then the canopy is actuated or moved so as to fit closely to adjacent the aircraft as reasonably possible. Such movement must be undertaken with care so as to avoid the canopy or enclosure structure damaging the aircraft hull. The canopies used do not normally accurately fit or engage different types of aircraft because of the differences in the curvatures of such aircraft. The canopy structure used is, of course, withdrawn from engagement with an aircraft prior to the aircraft being moved away from the bridge.

Canop or canopy-type enclosures are used in a similar manner in other fields such as, for example, in the trucking business at so-called loading docks. In all of such fields where these canopies are used there are common problems involving providing a simple, effective, inexpensive canopy structure which will adequately enclose a space between a vehicle and an access opening, and which can be easily and conveniently used for a prolonged period without damaging. Such problems are normally coupled with a problem of making such a canopy so that it has a relatively "neat" appearance.

BRIEF SUMMARY OF THE INVENTION:

A broad objective of the present invention is to provide new and improved canopy structures of the type indicated in the preceding discussion. Another related objective of the invention is to provide canopies which, although presently intended for use with aircraft loading bridges, include features which are applicable to other related applications. Further objectives of the invention are to provide relatively simple, relatively effective, relatively inexpensive, reasonably appearing canopy structures of the type provided which can be easily and conveniently used with a minimum of difficulty without danger of causing damage and which are capable of providing prolonged, reliable performance.

In accordance with this invention these and various related objectives are achived by providing an inflatable canopy utilizing an inflatable member and means for inflating the member from a folded to an inflated position. The inflatable member is divided up into internal sections located in a side by side relationship with one another. A first one of these sections is mounted on a supporting means so as to extend across the top and along the sides of an opening in a structure. The subsequent sections vary in length so that when the inflatable member is inflated it will flare outwardly so that when the inflatable member is inflated it will conform to the shape of a vehicle body such as an aircraft hull to be utilized in connection with the canopy.

Preferably a canopy of the invention is much more detailed and extensive than this would indicate. Preferably such a canopy includes a frame means or structure as hereinafter described for supporting the various sections of the inflatable member, a folding means as subsequently indicated for folding the inflatable member from an inflated position to a folded or collapsed position. Also, support means are preferably pivotally mounted upon a structure with which the canopy is used in such a way that the canopy may be rotated to conform to a vehicle body if such a vehicle is not parked in a desired manner parallel to the support member or means.

BRIEF DESCRIPTION OF THE DRAWINGS:

Because of the nature of this invention it is best described in more detail than is possible than in a summary-type discussion, such as the preceding discussion with reference to illustrations of a canopy in accordance with this invention. It is believed that the nature of the invention will be more fully apparent from a detailed consideration of the remainder of this specification and the accompanying drawings in which:

FIG. 2 is a side elevational view taken at line 2—2 of FIG. 1 in which certain parts have been broken away in order to facilitate an understanding of the invention;

FIG. 3 is a partial cross-sectional view taken at line 3—3 of FIG. 2; and

Figure 1:
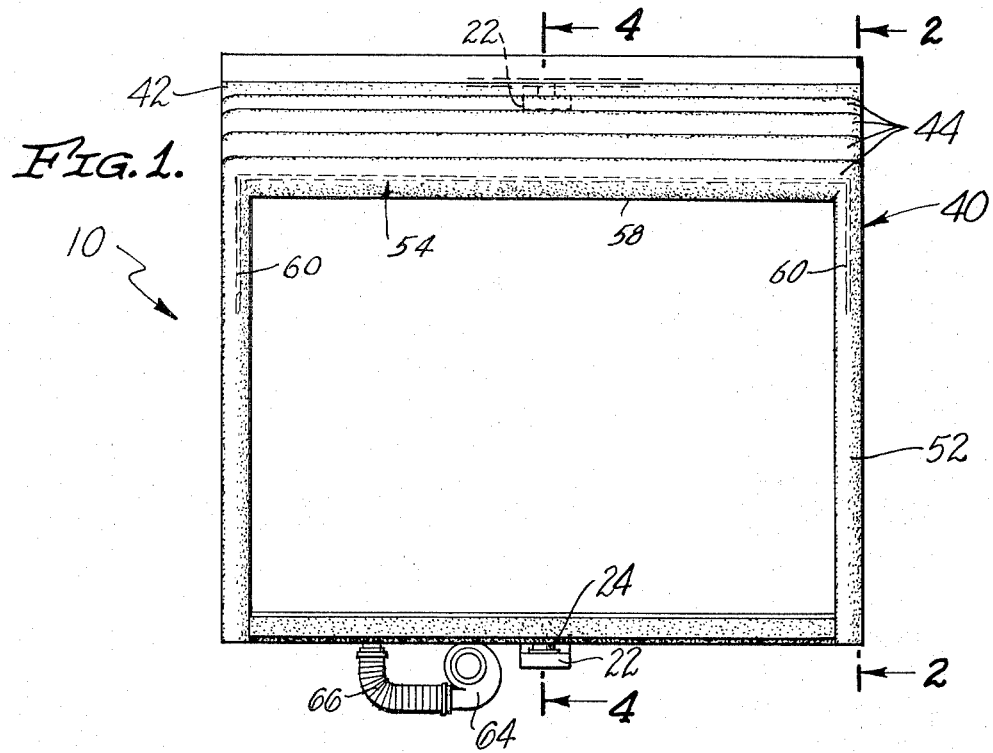
FIG. 1 is a front elevational view of a presently preferred embodiment or form of a canopy in accordance with this invention in an inflated position.
Figure 4:
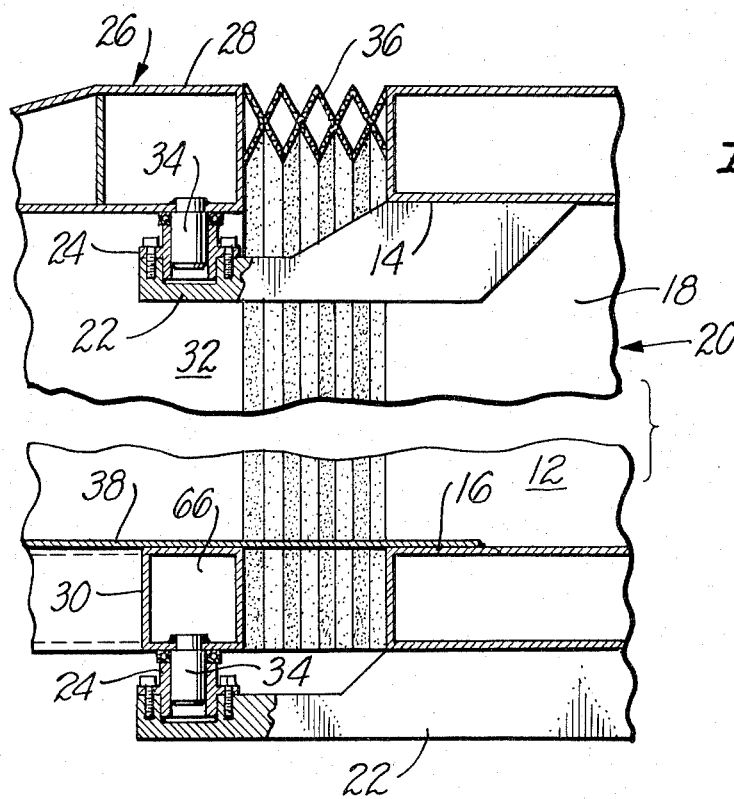
FIG. 4 is a partial cross-sectional view taken at line 4—4 of FIG. 1.

The particular canopy illustrated is a particular, presently preferred structure embodying the essential features or concepts of this invention as are set forth in the appended claims forming a part of this disclosure. These features or concepts can be embodied within other somewhat differently appearing or somewhat differently constructed canopies by the use or exercise of routine engineering skill in the loading bridge field. For this reason the accompanying drawings are not to be taken as limiting this invention.

DETAILED DESCRIPTION OF THE PREFERRED EMBODIMENT:

In the drawings there is shown an inflatable canopy or enclosure 10 in accordance with this invention which is utilized in at least partially enclosing the space between an opening 12 having a top 14, a bottom 16 and connecting sides 18 in an aircraft loading bridge 20 and a vehicle such as an aircraft (not shown) parked adjacent to this opening 12. In the structure shown, the top 14 and the bottom 16 both carry upstanding arms 22 which support bearings 24 in a comparatively short distance away from the opening 12. These arms 22 are preferably located as shown at the centers of the top 14 and the bottom 16 so as to extend generally away from the bridge 20.

The canopy 10 includes a rectilinear frame body 26 having a top 28, a bottom 30 and connecting sides 32. This frame body 26 corresponds in internal dimensions to the internal dimensions of the opening 12. The top 28 and the bottom 30 carry dependent shafts 34 fitted within the bearings 24 in such a manner that the frame body 26 may be rotated through a comparatively small arc about a vertical axis. This arc is normally made large enough so that the frame body 26 may be swung about this axis to a sufficient extent so as to be generally parallel to the body portion of any vehicle parked adjacent to the opening 12. The extent of this arc will, of course, vary depending upon how "unparallel" it is expected that vehicles will be parked relative to the opening 12.

A bellows 36 is used with the described structure to connect the top 14 with the top 28, the bottom 16 with the bottom 30 and the sides 18 with the sides 32. This bellows 36 is preferably formed out of a weather impervious fabric or the like so as to be capable of extending and contracting during rotation of the frame body 26 in order to accommodate such rotation.

The bottom 30 of this frame body 26 preferably holds a flat, overlapping floor section 38 which extends from the frame body 26 across the bottom 16 of the opening 12 and into the bridge 20 a short distance. This floor section 38 is of approximately the width of the bottom 16, but is tapered slightly at its side edges so as to accommodate the described rotation of the frame body 26. As this frame body 26 is rotated this floor section will slide along the bottom 16 so that there will be no danger of a person or an object falling on to the bellows 36 or tripping on this bellows 36. In effect, this floor section 38 is a sliding floor means permitting the frame body 26 to be rotated.

The frame body 26 serves as a support means in order to hold an inflatable member 40 in such a manner that when it is inflated it will project from the bridge 20 as shown. This inflatable member 40 is preferably formed of an impervious, flexible material such as a rubber coated canvas or the like so as to be divided up into a first section 42 and a plurality of subsequent sections 44. All of these sections 42 and 44 are of a similar character and are located in a side by side relationship. Each of the sections 42 and 44 has a top 46 extending across the top of the member 40 and downwardly directed sides 48 extending in generally the same plane as the sides 32. Thus, the sections 42 and 44 essentially have the appearance of inverted U's.

These sections 42 and 44 are formed so that all of the sections 44 have open ends 50 at the bottoms of their sides 48 within the member 40. Thus, the sides 48 of the first section 42 are open to the next adjacent of the sections 44 through the ends 50 of the next adjacent one of these sections 44, and the sides 48 of the section 44 next to the section 42 are open through its ends 50 to the sides 48 of the section 44 adjacent to this section 44 and so on.

In effect, this structure provides a continuous open channel 52 in the member 40 extending from the bottoms of the sides 48 of the first section 42 which, when the member 40 is inflated, extends outwardly from the frame body 26 in an arc roughly corresponding to the shape of an aircraft hull. When the member 40 is inflated this channel 52 serves as a bumper against such a hull. Because of the successive sections 44 varying in the lengths of their sides 48 away from the first section 42 and the frame body 26, this channel 52 also serves another important function of placing the ends 50 in communication with one another.

With this construction the tops 46 of the sections 42 and 44 all lie parallel and adjacent to one another so that they will form a continuous roof for the canopy 10 when the member 40 is inflated. The sides 48 are preferably tapered so as to be smaller adjacent to their bottoms than they are at their tops so that a curved-type flare is achieved with the member 40 when it is inflated. With the structure described, the sides 48 all lie in two parallel planes.

In both a folded and an unfolded position the various sections 42 and 44 are supported by a series of supports, including a first support 54 and subsequent of supports 56. Each of these supports 54 and 56 is of an inverted U-shaped configuration and includes a top 58 and two dependent parallel legs 60. Each of these supports 54 and 56 corresponds with and is positioned generally within one of the sections 42 or 44. The first support 54 is pivotally mounted on small extensions 62 with the frame body 26 so as to be entirely positioned within the first section 42. The legs 60 of this first support 54 are preferably curved or bent slightly to conform to the desired shape of the canopy 10 as it is to be utilized. In FIG. 1 the front or closest adjacent support 54 is shown in dotted lines so as to indicate the positions of its tops 58 and its legs 60 relative to the section 44 in which it is located. It will be apparent that the other supports 54 and 52 are located generally in back of the particular support 54 illustrated in FIG. 1 in such a manner that the tops 58 of all of the supports 52 and 54 are parallel.

Along the length of the legs 60 of the first support 54 generally adjacent to the channel 52, the legs 60 of the support 56 adjacent to the support 54 are pivotally connected to the legs 60 of the support 54. Subsequent supports 56 are similarly connected to legs of adjacent supports 56 in a similar manner so that the entire series of supports 54 and 56 in effect constitutes a frame means which may be pivoted between an open or inflated position as indicated and a folded or closed position in which all of the supports 56 lie adjacent to the periphery of the frame body 26.

Because of various supports 54 and 56 are located as shown within the member 40 in various sections 42 and 44 as indicated, these supports 54 and 56 are not normally visible and are normally shielded from weather conditions which might interfere with the operation of their pivots by the member 40. In all positions of the member 40, these supports 54 and 56 serve their intended functions of preventing the member 40 from sagging. They also serve to give the inflated member 40 a desired functional neat appearance and reinforce the member 40 against normal bending or flapping in the wind.

During the utilization of the canopy 10 a small blower unit 64 mounted on the bottoms 30 of the frame body 26 is actuated so as to force air through channels 66 into the bottoms of the sides 48 of the first section 42. As successively quantities of air are blown in this manner the entire member 40 will become inflated and during such inflation the supports 54 and 56 will pivot to positions as shown. Normally such inflation will move the member 40 outwardly in contact with an aircraft hull. The channel 52 and the flexibility of the pivoted supports 54 and 56 will normally permit this member 40 to be brought into engagement with such a hull without damage so as to adequately seal off the space between it and the bridge 20.

When the canopy 10 is no longer to be used the blower 64 is shut off. At this point, a folding means including two cables 68, four pulleys 70 and two counterweights 72 serves to automatically pull back the supports 54 and 56 so as to fold the member 40 in such a way that it fits tightly against the top 28 and the sides 32 of the frame body 26. Each of the pulleys 70 is mounted along the top 28 adjacent to one of the sides 32. The pulleys 70 are located so that these cables 68 pass over them so as to extend generally parallel to the sides 32. Each of the cables 68 passes through a very restricted opening 74 into the first section 42 and then into other restricted openings in the tops 46 of the sections 44 and has an end 76 attached to the top 58 of one of the supports 56 furtherest removed from the first support 54.

Each of the cables 68 also carries adjacent to a side 32 of the frame body 26 one of the counterweights 72. These counterweights 72 are preferably of such a mass as to be incapable of preventing full inflation of the member 40 during operation of the blower 64, but are of such a mass as to permit and cause deflation of the member 40 by forcing air "backwards" through the blower 64 and out through the openings 74. If desired, deflation may be facilitated by mounting flapper-type check valves 78 on the sides 48 of the first section 42. Such valves 78 can, of course, be used in other locations.

We claim:

1. An inflatable canopy for use in at least partially enclosing the space between an opening having a top, a bottom and connecting sides located in a structure and a vehicle located adjacent to said opening, said canopy having an inflatable member located so as to extend from the periphery of said opening and means for inflating said member from a folded to an inflated position, in which the improvement comprises:

said inflatable member having sides extending generally along the sides of said opening and having a top extending generally across the top of said opening, said member being divided up internally into a plurality of internal sections located in side by side relationship to one another, the section located adjacent to said opening having sides which are longer than the sides of the other of said sections and which extend the entire length of said member, means for supporting said adjacent section upon said opening so that said adjacent section extends along the sides of said opening and across the top of said opening, said sections being in communication with one another so that as said means for inflating said member is operated all of said sections are inflated, the sides of said sections varying in lengths so that when said member is in said inflated position said member will flare outwardly from adjacent to the bottoms of said sides of said member so that the top of said member will extend further from the top of said opening than the bottoms of the sides of the section located adjacent to said opening.

2. An inflatable canopy as claimed in claim 1 including:

frame means for supporting at least the center regions of said sections of said inflatable member in all positions of said inflatable member.

3. An inflatable canopy as claimed in claim 1 wherein:

said means for supporting comprises a frame body pivotally mounted on said structure so as to be capable of rotating about a vertically extending axis relative to said structure.

4. An inflatable canopy as claimed in claim 3 wherein:

said frame body is spaced from said structure and including bellows means for enclosing the space between said frame body and said structure connecting said frame with said structure around said opening.

5. An inflatable canopy as claimed in claim 1 including:

folding means for folding said inflatable member connected to the one of said sections furtherest from said first of said sections.

6. An inflatable canopy as claimed in claim 5 wherein:

said folding means comprises:

a counterweight connected to the one of said sections furtherest removed from said first of said sections so as to be capable of automatically moving said inflatable member to a folded position when said inflatable member is not in an inflated position.

7. An inflatable canopy as claimed in claim 1 including:

frame means for supporting at least the center regions of said sections of said inflatable member in all positions of said inflatable member, and wherein said means for supporting comprises a frame body pivotally mounted on said structure so as to be capable of rotating about a vertically extending axis relative to said structure, folding means for folding said inflatable member connected to the one of said sections furtherest from said first of said sections.

8. An inflatable canopy as claimed in claim 7 wherein:

said frame body is spaced from said structure and including, bellows means for enclosing the space between said frame body and said structure connecting said frame with said structure around said opening, said folding means comprises:

a counterweight connected to the one of said sections furtherest removed from said first of said sections so as to be capable of automatically moving said inflatable member to a folded position when said inflatable member is not in an inflated position, and including overlapping means connecting the bottom of said frame means and the bottom of said opening, said overlapping means permitting said frame means to be pivoted with respect to said structure.

9. An inflatable canopy as claimed in claim 1 including:

a plurality of rigid inverted, U-shaped supports, each of said supports having a center region and two legs, said center regions of said supports corresponding in length to the distance across the top of said inflatable member, said legs of said supports varying in length, a first one of said supports having legs corresponding to the lengths of said sides of said member and having the extremities of its legs remote from its center region pivotally mounted on said means for supporting adjacent to the bottoms of the sides of said member, the remainder of said supports being pivoted at the ends of their legs remote from their center regions on other of said supports so that during inflation of said member all of said supports will pivot to a configuration corresponding to the configuration of said sections, at least the center regions of all of said supports being positioned generally parallel to one another so as to support said top of said member in all positions of said member in order to control sagging of said top with said member.

10. An inflatable canopy as claimed in claim 9 including:

counterweight means for automatically pivoting said supports and moving said sections from said inflated position to said folded position when said inflatable member is not inflated.

11. An inflatable canopy as claimed in claim 9 wherein:

said sides of said sections are successively shorter in accordance with their placement relative to said first of said sections, said sides of said sections other than said first of said sections have ends which are open into the interiors of the sides of the next adjacent of said sections, said legs of said supports are successively shorter in accordance with their locations relative to said first of said supports, said sides of said sections and said legs of said supports being of such lengths that said sections and said supports lie together in a compact unit when said inflatable member is in said folded configuration and extend in the same general configuration when said inflatable member is in said inflated configuration.

12. An inflatable canopy as claimed in claim 11 wherein:

said first of said sections corresponds to said first of said supports and wherein, each of the other of said sections corresponds to each of said other supports, each of said supports serves to support one of said sections at the top of said member in all positions of said member in order to control the sagging of said top of said member.

13. An inflatable canopy as claimed in claim 12 wherein:

each of said supports is located within one of said sections, said first of said supports being located within said first of said sections, the other of said supports having legs which extend through the ends of the sides of the sections within which they are located.

14. An inflatable canopy as claimed in claim 13 including:

counterweight means for automatically pivoting said supports and moving said sections from said inflated position to said folded position when said inflatable member is not inflated.

15. An inflatable canopy as claimed in claim 14 wherein:

said counterweight means comprises flexible cable means, pulley means and weight means, said pulley means being mounted on said means for supporting, said cable means being connected to the one of said supports furtherest removed from said means for supporting and passing around said pulley means and said weight means being attached to said cable means so as to tend to pull said cable means in such a manner as to cause said supports to tend to pivot in order to move said supports and said inflatable member to said folded position.

16. An inflatable canopy as claimed in claim 15 wherein:

said cable means extend through all of said sections of said inflatable member so as to be normally hidden from view by said inflatable member.

17. An inflatable canopy as claimed in claim 1 wherein:

said means for supporting comprises a frame body pivotally mounted on said structure so as to be capable of rotating about a vertically extending axis relative to said structure, said frame body is spaced from said structure and including bellow means for enclosing the space between said frame body and said structure connecting said frame with said structure around said opening, a plurality of rigid inverted, U-shaped supports, each of said supports having a center region and two legs, said center regions of said supports corresponding in length to the distance across the top of said inflatable member, said legs of said supports varying in length, a first one of said supports having legs corresponding to the lengths of said sides of said member and having the extremities of its legs remote from its center region pivotally mounted on said means for supporting adjacent to the bottoms of the sides of said member, the remainder of said supports being pivoted at the ends of their legs remote from their center regions on other of said supports so that during inflation of said member all of said supports will pivot to a configuration corresponding to the configuration of said sections, at least the center regions of all of said supports being positioned generally parallel to one another so as to support said top of said member in all positions of said member in order to control sagging of said top with said member, said sides of said sections are successively shorter in accordance with their placement relative to said first of said sections, said sides of said sections other than said first of said sections have ends which are open into the interiors of the sides of the next adjacent of said sections, said legs of said supports are successively shorter in accordance with their locations relative to said first of said supports, said sides of said sections and said legs of said supports being of such lengths that said sections and said supports lie together in a compact unit when said inflatable member is in said folded configuration and extend in the same general configuration when said inflatable member is in said inflated configuration, said first of said sections corresponds to said first of said supports and wherein, each of the other of said sections corresponds to each of said other supports, each of said supports serves to support one of said sections at the top of said member in all positions of said member in order to control the sagging of said top of said member, each of said supports is located within one of said sections, said first of said supports being located within said first of said sections, the other of said supports having legs which extend through the ends of the sides of the sections within which they are located, counterweight means for automatically pivoting said supports and moving said sections from said inflated position to said folded position when said inflatable member is not inflated, said counterweight means comprises flexible, cable means, pulley means and weight means, said pulley means being mounted on said means for supporting, said cable means being connected to the one of said supports furtherest removed from said means for supporting and passing around said pulley means and said weight means being attached to said cable means so as to tend to pull said cable means in such a manner as to cause said supports to tend to pivot in order to move said supports and said inflatable member to said folded position, said cable means extend through all of said sections of said inflatable member so as to be normally hidden from view by said inflatable member, and including, overlapping means connecting the bottom of said frame body with the bottom of said opening for providing a continuous floor across the space between said structure and said frame body during pivoting of said frame body.

* * * * *